April 2, 1929.  J. L. KIVLAN  1,707,439
SPRING JAR CLOSURE
Filed March 11, 1927  2 Sheets-Sheet 1
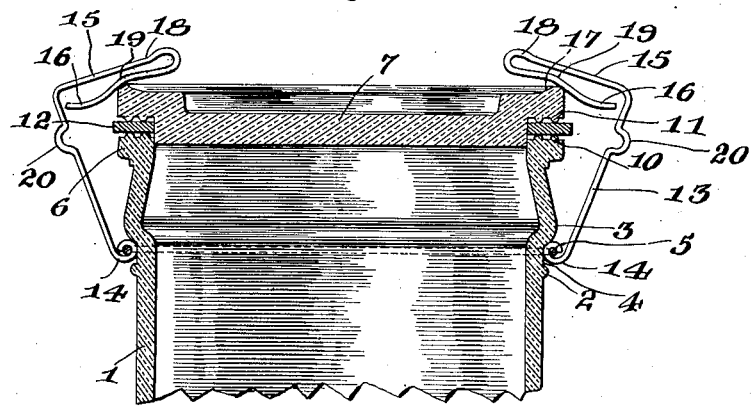
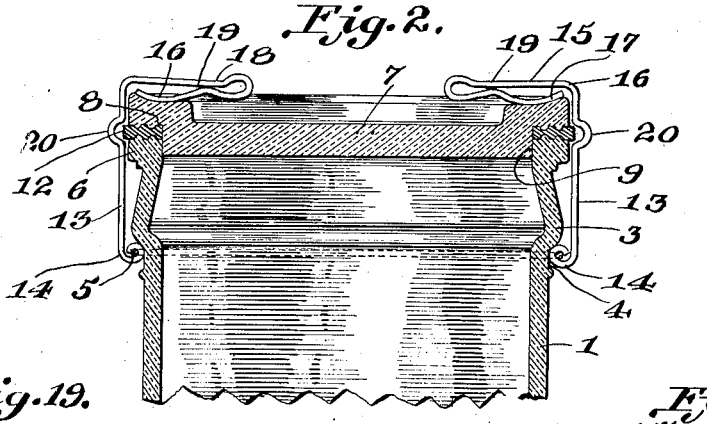
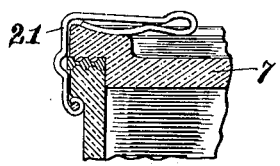
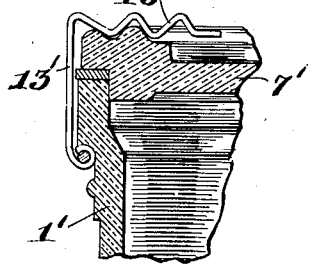
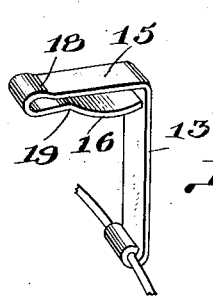
Inventor
John L. Kivlan
By Mason Fenwick & Lawrence
Attorneys April 2, 1929.　　　J. L. KIVLAN　　　1,707,439
SPRING JAR CLOSURE
Filed March 11, 1927　　　2 Sheets-Sheet 2
Fig. 4.
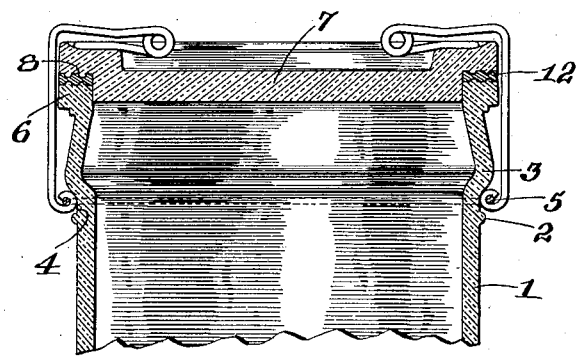
Fig. 5.　　Fig. 7.　　Fig. 9.　　Fig. 11.
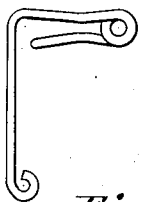　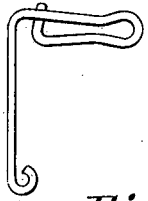　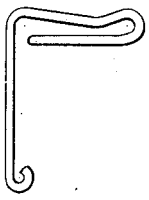　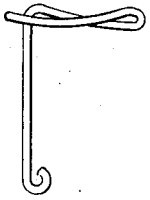
Fig. 6.　　Fig. 8.　　Fig. 10.　　Fig. 12.
　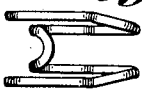　　
Fig. 15.　　Fig. 17.
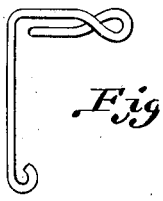　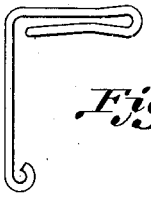　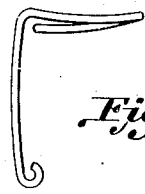
Fig. 13.　　Fig. 15.
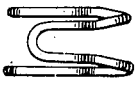　
Fig. 14.　　Fig. 16.
Inventor
John L. Kivlan Patented Apr. 2, 1929.

1,707,439

UNITED STATES PATENT OFFICE.

JOHN L. KIVLAN, OF ROSLINDALE, MASSACHUSETTS, ASSIGNOR OF ONE-HALF TO EMMA ADELAIDE ONTHANK, OF NEWTON, MASSACHUSETTS, AND ONE-HALF TO ELLA LOUISE DONOHOE, OF ROSLINDALE, MASSACHUSETTS.

SPRING JAR CLOSURE.

Application filed March 11, 1927. Serial No. 174,625.

This invention relates to containers generally, and particularly to containers of the glass jar type adapted for use in the canning and preserving of foodstuffs, and for conveniently packaging all kinds of material.

The main object of the invention is to provide containers of the type disclosed herein with closures positively held to their seats by means adapted to yield and permit the escape of gases and vapors from the container when the pressure therein exceeds a predetermined limit.

Another object of the invention is to provide closure members of this type with locking springs of extreme simiplicity and capable of being manufactured at almost negligible cost.

A further object of the invention is to shape the closure fasteners so that rubber gaskets of different widths may be used between the jar and closure members.

Another object of the invention is to provide the top of the jar and one face of the closure with cooperating seats having concentric ridges to receive the intervening gasket and ensure effective sealing of the jar under all conditions of unevenness in the cooperating seats or variation in thickness of the gaskets.
Other objects will become apparent as the detailed description proceeds.

In the drawing:—

Figure 1 is a central vertical section of the upper part of a jar embodying this invention, and with clamping members just started into clamping engagement with the jar-closure;

Figure 2 is a similar section showing the clamps in fully operative position with the closure clamped down tight on the jar;

Figure 3 is a perspective view of one of the spring clips shown in Figures 1 and 2.

Figure 3ª is a perspective view of a slightly modified form of the clip shown in Figure 3.

Figure 4 is a central vertical section of the upper part of a jar provided with a modified form of clip.

Figures 5, 7, 9, 11, 13, 15 and 17 are elevations of different forms of clips which may be used as substitutes for that shown in Figure 1;

Figures 6, 8, 10, 12, 14, 16 and 18 are plan views of the clips shown in Figures 5, 7, 9, 11, 13, 15 and 17, respectively;

Figure 19 is a fragmentary sectional view of a modified form of the invention shown in Figures 1 and 2, and, Figure 20 is a similar view of another modification thereof.

The clips shown on all the figures are substantially the same so far as their operation and function are concerned. They are all designed to exert a distributed yielding pressure on the edge of the jar-closures directly over the seat of the closure.

As shown in Figures 1, 2 and 3, 3ª, and 19 and 20, these clips are formed of bands of sheet metal. In the other figures, the clips are formed by bending a single strip of wire into the desired shapes.

In the drawings (Figures 1 and 2) there is shown a cylindrical jar 1 having a bead 2 and a projecting part 3 forming with said bead a channel 4 adapted to form a retaining seat for the wire ring 5 extending around the jar in said seat.

The upper end of the jar 1 is expanded to form a broad seat 6 for the closure 7 which has its outer periphery shaped to form a recess 8 and a shoulder 9 fitting slidably and snugly into the open mouth of the jar 1. The seat 6 and recess 8 are moulded to provide cooperating sealing rings or corrugations 10 and 11, which are adapted to sink into a gasket 12 of rubber or similar material and form an effective seal for the contents of the jar even when the gasket varies in thickness in the several parts thereof.

The spring clips shown in Figures 1, 2, and 3 are each made of a single strip or band of metal 13 having one end 14 thereof bent arount the wires 5 to pivot thereon and serve as a hinge for the clip. The upper part 15 of the clip is bent substantially at right angles to the side part 13, and is doubled under to form a leaf spring plate 16 curved to fit solidly in a correspondingly curved depression 17 on the top of the closure 7. Each of the parts 15 and 16 are provided with crimps 18 and 19, respectively, near their junction, to act as fulcrums for each other, and thereby enhance the relatively yieldingly spring effect of the clip as a whole.

Intermediate the parts 14 and 15 the part 13 is provided with a comparatively deep crimp 20 positioned so as to receive the projecting periphery of a gasket wider than the seat 6 and recess 8 in cases where it might not be possible or convenient for the user to obtain gaskets of the proper width. The crimp 20 also serves to increase the springlike qualities of the clip as a whole.

The clip shown in Figure 3ª, is identical in general shape and function with that shown in Figures 1, 2 and 3, but the back 13 is made plain instead of having the intermediate crimp 20. This is merely a simplified and cheaper form of clip than that shown in Figure 3 and may be used as a substitute therefor.

In the various modifications shown in Figures 4 to 18 inclusive, each clip is made of a single strip of wire having its several parts bent and crimped to give the proper springlike effect to the lower bent-under parts adapted to contact with the top of the closure. Their construction will be obvious from the drawing and need not be further described in detail in this application; and as their operation and function are substantially the same as the operation and function of the clips shown in Figures 1, 2 and 3, a detailed description of the operation of the latter will suffice for all.

It will be noted from the drawing that the crimped point 19 is not directly opposite the point 18, but is located about one-third of the way in from the bent-over junction of the parts 15 and 16. This is an important feature of this invention, as it will be apparent that when the spring clip is thrown into clamping position the point 19 contacts with the part 15, and adds the springy effect of this part relative to the part 13 to the natural spring leaf effect of the blade 16. The crimp 20, of course, increases the spring effect of the part 13, and the entire construction obviously utilizes every resilient quality inherent in the metal of which the clip is constructed from the pivot end 14 to the inner end of the blade 16. Because of this peculiar crimping and bending of the metal it has been found unnecessary to harden the clips since none of the crimped or bent elements are bent during their operative spring action, beyond the natural limits of resilience or fatigue of the metal.

One of the most important advantages of the jars shown herein resides in their adaptability for use in preserving, canning or sterilizing foodstuffs. When seated as shown in Figures 2 and 4, the jars may be completely submerged in the sterilizing or cooking liquid; and, when the pressure within the jars rises beyond a predetermined limit, the springs yield to allow the closure to rise sufficiently to permit the escape of excess gases and vapor from the interior of the jar. As soon as the interior pressure falls below that exerted by the springs clips the jars immediately become sealed without allowing the surrounding sterilizing or cooking liquid to enter the jars. Obviously, too, this method of automatic sealing under liquid prevents access of germs or bacteria to the food stuffs in the jars and therefore prevents their spoiling.

Another great advantage of jars of this type resides in the spring members being constructed so as to hold the closures without rattling directly on the top of the jars with the gaskets omitted therefrom. Jars of this type are usually shipped in packages of one dozen, with a package of a dozen gaskets or rings placed in one of the jars to be removed and used only when the jars are put into use. Jars of the type heretofore in use when shipped in the customary way without their gaskets in place have been subject to chipping and spoiling by reason of the loose rattling fit between the jars and their closures.

In the modification shown in Figure 19, the clip 21 is shorter than any of the clips shown in the remaining figures of the drawing, and enables the clips to be hinged directly under the top flange of the jar. This will obviously cheapen the cost of manufacture since it avoids the necessity of providing the jars with intermediate wire retaining beads, the omission of which gives the jar a longer body line and therefore permits the jars to display their contents to better advantage.

In the modification shown in Figure 20, the clip 13' is hinged directly under the top flange of the jar 1', as in Figure 19, and the horizontal part 15' is corrugated to fit into annular notches 17' formed on top 7' of the jar. For preserving purposes the operation of this form of the invention is somewhat similar to the operation of the devices shown in the remaining figures. It is illustrated here mainly for the purpose of showing a feature common to all forms described herein; namely, the long overhang of the horizontal parts of the clip over the retaining parts of the cover to adapt the clips for ready disconnection from the covers by the insertion of a finger or thumb under the free ends of the clips.

I claim:

1. The combination with a jar, of a cover fitting the mouth thereof, spring clamps hinged to said jar and yieldingly holding said cover on said jar, each clamp comprising a single strip of metal bent at one end to form a hinge connection and bent intermediate its ends to form two parts substantially at right angles to each other, the part remote from the hinge connection being return bent and crimped to form a leaf spring the free end of which engages said cover at the edge thereof to hold the cover yieldingly seated on said mouth.

2. The combination with a jar, of a cover fitting the mouth thereof, clamps hinged to said jar below the mouth thereof, and each return bent over said cover to form leaf springs having the free ends thereof engageable with said cover at the edge thereof to hold the cover yieldingly seated on said jar, said leaf springs extending radially of said cap.

3. The combination with a jar, of a cover seated thereon, and having its top concaved inwardly from the edge thereof, clamps hinged to said jar below the mouth thereof and each return bent intermediate its ends to form a leaf spring having the free end thereof adapted to seat in yielding locked engagement with said concaved edge directly over the seat between said jar and cover, said leaf springs extending radially of said cap.

In testimony whereof I affix my signature.

JOHN L. KIVLAN. [L. S.]